United States Patent [19]
Vornehm et al.

[11] Patent Number: 5,928,110
[45] Date of Patent: Jul. 27, 1999

[54] POWER TRAIN WITH AUTOMATED CLUTCH FOR USE IN MOTOR VEHICLES

[75] Inventors: Martin Vornehm, Buhl; Martin Zimmermann, Sasbach, both of Germany

[73] Assignee: Luk Getriebe-Systeme GmbH, Buhl, Germany

[21] Appl. No.: 09/032,648

[22] Filed: Feb. 27, 1998

[30] Foreign Application Priority Data

Feb. 27, 1997 [DE] Germany .............................. 197 07 907

[51] Int. Cl.⁶ .................................................. F16H 61/12
[52] U.S. Cl. ............................. 477/166; 477/79; 477/114; 477/906
[58] Field of Search ..................... 477/114, 166, 477/174, 180, 906, 70, 79, 86

[56] References Cited

U.S. PATENT DOCUMENTS

| | | | |
|---|---|---|---|
| 4,584,908 | 4/1986 | Nishikawa et al. | 477/114 |
| 4,955,255 | 9/1990 | Yamaashi et al. | 477/906 X |
| 5,169,365 | 12/1992 | Friedmann . | |
| 5,374,218 | 12/1994 | Reik et al. . | |
| 5,377,796 | 1/1995 | Friedmann et al. . | |
| 5,409,091 | 4/1995 | Reik et al. . | |
| 5,632,706 | 5/1997 | Kremmling et al. | 477/74 |

FOREIGN PATENT DOCUMENTS 44 26 260  2/1995  Germany .

*Primary Examiner*—Charles A Marmor
*Assistant Examiner*—Sherry Estremsky
*Attorney, Agent, or Firm*—Darby & Darby

[57] ABSTRACT

The power train of a motor vehicle has an electronic unit which controls the condition of an automated clutch between the engine and a manually shiftable transmission. The control unit has a normal or standard operating mode when the various sensors which are connected with and transmit signals to the control unit (as well as the signal transmitting connections such as buses and/or cables) are not defective, and a standby or emergency mode when one or more sensors and/or connections are (temporarily or irreversibly) defective. The control unit then prevents the clutch from permitting or causing a creeping or crawling movement of the vehicle while the engine is idling and the transmission is shifted in a gear other than neutral. The mode of operation of the control unit can be changed back to normal in response to termination of a faulty operation of one or more sensors and/or connections, for example, with a predetermined delay.

30 Claims, 4 Drawing Sheets

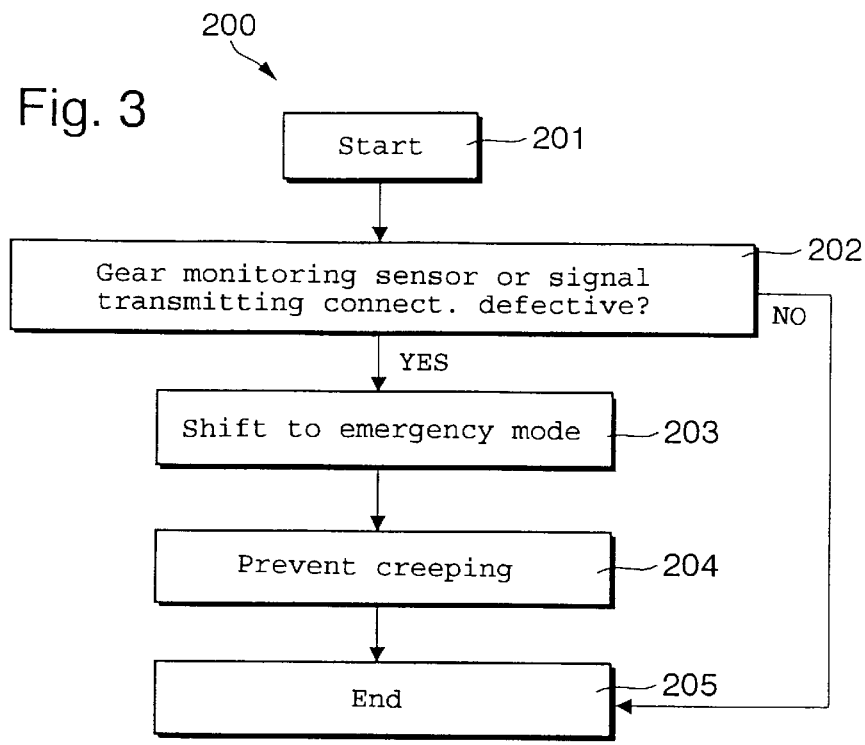

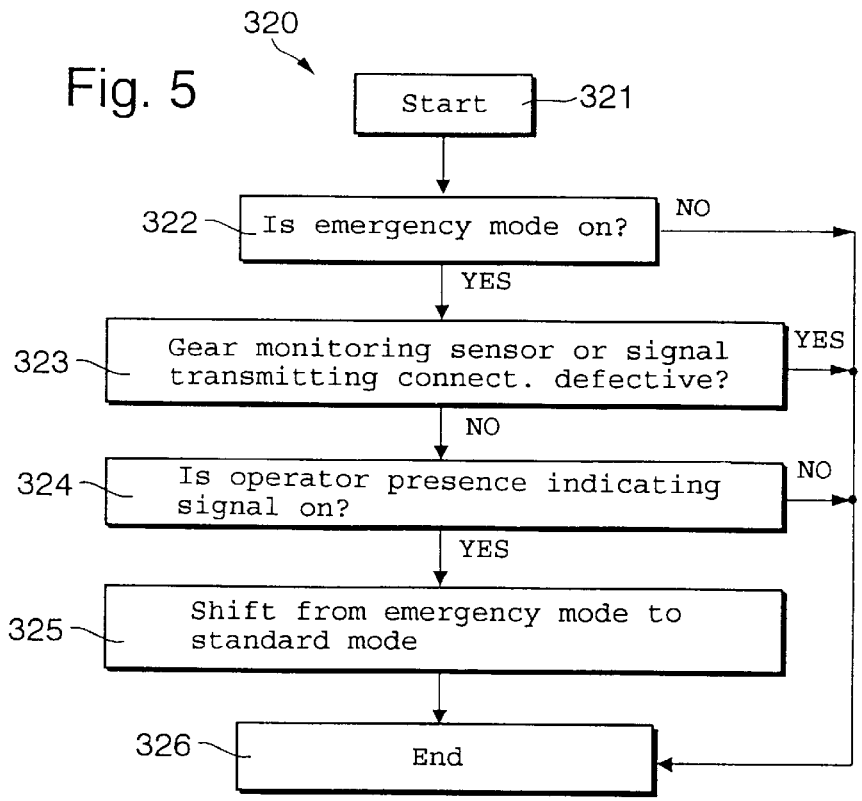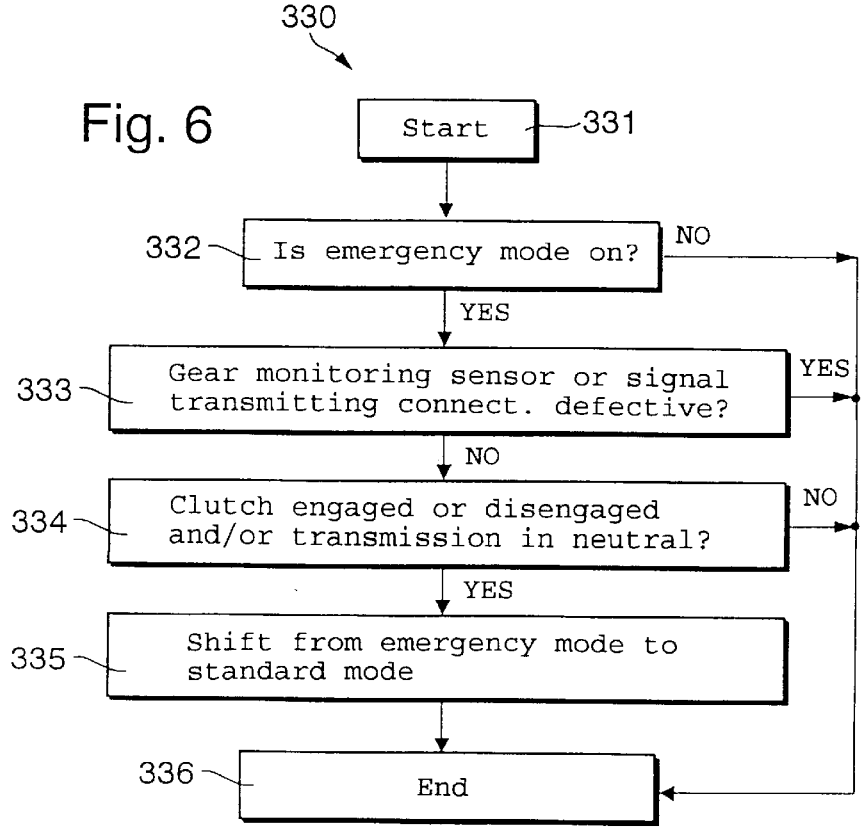

POWER TRAIN WITH AUTOMATED CLUTCH FOR USE IN MOTOR VEHICLES

BACKGROUND OF THE INVENTION

The invention relates to improvements in power trains for motor vehicles, and more particularly to improvements in power trains which employ automated transmissions and/or automated torque transmission systems (such as friction clutches). Still more particularly, the invention relates to improvements in power trains which employ sensors and which can be operated in a novel and improved way in the event of a temporary or non-reversible failure of one or more sensors. The invention also relates to improvements in methods of operating power trains of the above outlined character.

It is known to provide a motor vehicle (such as a passenger car or a truck) with a power train wherein an automated clutch determines the magnitude of the torque being transmitted from the rotary output element of a prime mover (such as a camshaft or the crankshaft of an internal combustion engine) to a rotary input element of a variable speed transmission. The condition of the clutch (i.e., the extent of its engagement or disengagement) is determined by signals furnished by a control unit to one or more actuators (such as electric, fluid-operated or other suitable motors) which actually select the condition of the clutch, and a signal processing circuit of the control unit receives and processes signals from several sensors (such as RPM monitoring devices, sensors responding to changes in the condition of one or more brakes, one or more sensors which monitor the selected gear of the transmission, one or more sensors serving to monitor the positions of the gas pedal and/or the throttle valve for the engine, and/or others. The arrangement is normally such that the motor vehicle is set in motion (e.g., to carry out a crawling or creeping movement) when the combustion engine is on, the transmission is in (forward or reverse) gear, and the gas pedal is not depressed. Such mode of operation of the control system including the control unit and the actuator(s) for the clutch can be defined as a normal or standard operating mode.

Control units of the just outlined character can be utilized in power trains with automated transmissions and/or automated clutches. The clutch is normally installed in the power train in such a way that it can transmit torque between the prime mover and the driven wheels of the vehicle, particularly between the engine and the transmission. The vehicle can be caused to perform a desired creeping or crawling movement in response to appropriate adjustments of the clutch, i.e., in response to appropriate selection of the torque which the clutch can transmit (e.g., from the engine to the transmission of the vehicle). A creeping or crawling movement is often desirable when the engine is on, the transmission is shifted into a selected (forward or reverse) gear, the brake(s) is (or are) not applied, and the gas pedal is not depressed. The speed of creeping movement is reduced, or such movement is interrupted or terminated, when the operator of the motor vehicle decides to apply a brake (e.g., the standard vehicle brake which is controlled by a brake pedal and/or a parking brake which is actuated by a reciprocable and/or pivotable manually operated lever). Reference may be had, for example, to published German patent application Serial No. 44 26 260.

The sensors which generate and transmit signals denoting one or more parameters (such as the RPM of a rotary element of the combustion engine, the RPM of a rotary input or output element of the transmission, the extent of engagement (i.e., the condition) of the friction clutch, the position (extent of depression) of the gas pedal, the inclination of a pivotable component (such as a flap) of the throttle valve, the position(s) of the brake actuating member(s) and/or others) can be connected with the corresponding inputs of the (normally electronic) circuitry of the control unit by electrical conductors, by one or more data buses (such as CAN buses) or in any other suitable way. Such signals can also be transmitted to the inputs of an electronic engine circuit, to the inputs of an antiblock system (ABS) and/or to the signal storing and/or processing circuits. Furthermore, the various circuits (such as the electronic circuit of the control unit for an automatic or automated clutch and/or automatic or automated transmission and the electronic circuit for the internal combustion engine) can be connected to each other by buses and/or other types of signal transmitting conductors.

A drawback of presently known controls for the components of power trains in motor vehicles is that they are not capable of reacting, or reacting satisfactorily, to the development of malfunctions, such as the temporary or uninterrupted (permanent) malfunctioning of one or more sensors and/or their connections with the signal-receiving circuit or circuits. For example, the component parts of a control system can develop short circuits, their conductors (such as cables) are likely to break as a result of an excessive impact or due to age, or the signals being transmitted by the sensors can become unreliable for other reasons. This can result in an interruption of the path or paths for the transmission of important or vital information pertaining to the condition of the motor vehicle and its power train. For example, a malfunctioning can involve a short-lasting or continuous interruption of the transmission of signals from a sensor for the gas pedal to the control circuit for an automated clutch, or an interruption of the transmission of signals to such control circuit from the sensor or sensors which monitors or monitor the condition (such as the selected gear or the momentarily effective gear) of the transmission. Such interruption is or can be attributable to a defect or to the defects of one or more sensors and/or to the defect of a connection between a sensor and a signal processing circuit.

It is already known to construct a control circuit in such a way that it automatically shifts from a normal or standard operating mode to an emergency or standby mode in response to receipt of information denoting that one or more sensors and/or the connection(s) between one or more sensors and the control unit is or are defective. As a rule, the operation of a control circuit in accordance with an emergency or standby mode (hereinafter called emergency mode) involves an undesirable (often very pronounced) reduction of comfort to the operator and/or other occupant(s) of the affected motor vehicle. Alternatively, or in addition to a reduction of comfort, the operation in accordance with an emergency mode often entails a pronounced reduction of the versatility (such as maneuvrability) of the affected motor vehicle.

If the sensors are not defective and the conections between the sensors and one or more control circuits are also satisfactory, the operator of the motor vehicle can shift the transmission into a selected gear while the engine is running, while the brake or brakes is or are not activated, and while the gas pedal is not depressed; this causes the vehicle to creep or crawl at a selected speed. Such speed is reduced to zero in response to shifting of the transmission from a forward gear or from the rearward gear into neutral.

If the operation of the control unit in accordance with an emergency mode is attributable to the defect(s) of one or more sensors which monitor the selected gear of the transmission and/or the defects of the signal transmitting connection(s) between such sensor(s) and the control unit, the latter cannot ascertain the condition (such as the selected gear) of the transmission while the engine is running, while the transmission is in a forward gear or in reverse gear, and while the gas pedal is not depressed. If the operator of the motor vehicle interprets such emergency mode as denoting that the transmission is shifted into a forward gear or into the reverse gear while the transmission is actually in neutral (or vice versa), this can result in an unwarranted, undesirable or dangerous crawling or creeping movement of the motor vehicle while the vehicle should remain or or should come to a standstill. If the operator misinterprets the actual condition of the transmission and/or of the clutch, the vehicle is likely to carry out an abrupt forward or rearward movement in response to subsequent shifting of the transmission into reverse or into a forward gear. In other words, the operation of the control unit or units in accordance with a conventional emergency procedure or mode is not satisfactory and is likely to involve a serious danger as well as serious discomfort to the occupant or occupants of the vehicle.

OBJECTS OF THE INVENTION

An object of the invention is to provide a power train which embodies one or more automated or automatic components (such as an automated transmission and/or an automated clutch) and whose operation in the normal mode as well as in the emergency mode of its control unit(s) is more reliable and more comfortable to the operator as well as to other occupant(s) of the motor vehicle than that of power trains employing conventional control units for their automated or automatic component or components.

Another object of the invention is to provide a power train which is safer than heretofore known (conventional) power trains regardless of whether its control unit or units are caused to operate in a normal or standard mode or in accordance with an emergency or standby mode.

A further object of the invention is to provide a power train wherein the defectiveness of one or more sensors and/or the failure of one or more signal transmitting connections between such sensor(s) and one or more control circuits is invariably detected and properly interpreted by the controls of the power train to thus prevent or to at least greatly reduce the likelihood of unsatisfactory operation of the motor vehicle during the existence of one or more defects or malfunctions.

An additional object of the invention is to construct and assemble the power train of a motor vehicle in such a way that its controls immediately and invariably recognize and properly react to the detected termination of a temporary failure of one or more sensors and/or one or more connections between the outputs of such sensors and one or more control circuits.

Still another object of the invention is to provide a novel and improved control system or control arrangement for use in power trains of the type having one or more automated or automatic components, such as an automated transmission and/or an automated torque transmission system (e.g., a friction clutch, the lockup clutch of a hydrokinetic torque converter or another suitable torque transmission system).

A further object of the invention is to provide a novel and improved method of operating a power train wherein the clutch and/or the transmission is automated and wherein one or more sensors (inclusive of their electrical or other suitable connections with one or more signal receiving, signal processing and signal transmitting control units) are prone to temporary, longer-lasting or non-reversible faulty operation or malfunction.

An additional object of the invention is to provide a motor vehicle which embodies the above outlined power train.

Another object of the invention is to provide a power train which can be installed in existing types or makes of motor vehicles as a superior substitute for heretofore known and utilized power trains.

SUMMARY OF THE INVENTION

One feature of the invention resides in the provision of a novel and improved power train which can be put to use in motor vehicles. The improved power train comprises a prime mover (such as an internal combustion engine with fuel injection system), means (such as an electronic engine circuit) for starting, operating and arresting the prime mover, a transmission which is arranged to receive torque from the prime mover and is shiftable into and from a plurality of gears (e.g., a reverse gear and two or more forward gears) in which the transmission tends to move the vehicle (e.g., through a differential, a driven axle, and a set of wheels), multiple-position means forming part of the transmission and serving to select gears, as well as to shift into and from selected gears, an automated system (such as a friction clutch) arranged to transmit torque from the prime mover to the transmission and having engaged and disengaged conditions, and means for controlling the torque transmitting system. The controlling means comprises a signal receiving, processing and transmitting control unit, an actuator which is arranged to select the magnitude of torque being transmitted by the torque transmission system in response to processed signals from the control unit, a plurality of signal generating sensors, and means for transmitting signals from the sensors to the control unit. The sensors and the signal transmitting means are prone to malfunction, and the control unit has a normal operating mode when the sensors and the signal transmitting means function properly, when the transmission receives torque from the torque transmission system, and when the transmission is shifted into one of the aforementioned gears to thus move the vehicle (e.g., at a creeping speed). The control unit can further assume an emergency operating mode which is set up in response to malfunctioning of at least one of the sensors and/or of the signal transmitting means and in which the vehicle is not set in motion while the prime mover is in operation and while the transmission is shifted into one of its forward gears or into the reverse gear.

The sensors which transmit signals to the control unit can include at least one sensor which is arranged to monitor the positions of a multiple-position throttle valve forming part of or associated with a prime mover which constitutes an internal combustion engine, at least one sensor which is arranged to monitor the positions of a multi-position fuel consumption regulator (such as a gas pedal) for the engine, and at least one sensor which serves to monitor the positions of the gear selecting and shifting means for the transmission.

Still further, the sensors which transmit signals to the control unit can include one or more sensors which monitor the positions of one or more brakes, such as a standard pedal-operated vehicle brake and/or a manually operated parking brake.

The aforementioned sensors can comprise an electronic circuit for the combustion engine, and such electronic circuit can include at least one of the starting, operating and arresting means of or for the prime mover.

If the vehicle is equipped with suitable antiblocking means (ABS) for the brake or brakes, the sensors can further comprise an electronic circuit for the antiblocking means.

The means for transmitting signals from one or more sensors to the control unit can comprise at least one bus and/or other electrical conductor means (such as cables).

The fuel consumption regulator for the prime mover (such as the aforementioned gas pedal) is normally mounted in such a way that it can assume an idle position, and the normal operating mode of the control unit can be set up in such a way that the vehicle can perform a crawling or creeping movement while the aforementioned prerequisites (namely the sensors and the signal transmitting means must function properly, the transmission must receive torque from the torque transmitting system and the transmission must be shifted into a forward gear or into reverse gear) for the standard operating mode are satisfied and the fuel consumption regulator assumes its idle position.

The emergency operating mode of the control unit can be selected in such a way that the vehicle is not set in motion while the fuel supply regulator assumes its idle position. In order to set the vehicle in motion while the control unit assumes its emergency operating mode, the fuel supply regulator must be shifted or otherwise moved from its idle position. Such movement of the fuel supply regulator can take place in dependency upon at least one of a plurality of variable parameters of the vehicle. The parameters can include at least one of: the RPM of a rotary component part of the engine, the angle of a pivotable component (such as a flap) of the throttle valve, the magnitude of the torque being transmitted by the engine, the position of the fuel consumption regulator, the timing of ignition of the engine, the timing of fuel injection into the cylinders of the engine, the quantity of fuel being supplied to the engine, the RPM of a rotary component (such as an input shaft or an output shaft) of the transmission, the speed of the vehicle, the selected gear of the transmission, the position or condition of the a least one brake, and the difference between the RPM of a component of the engine and the RPM of a component of the transmission.

The sensors and/or the signal transmitting means can be designed, constructed and/or mounted in such a way that at least one sensor and/or at least one of the signal transmitting means is prone to a mere temporary malfunction. Under such circumstances, the control unit can be constructed and assembled (arranged) to reassume its normal mode in response to a termination of temporary malfunction of the at least one sensor and/or at least one signal transmitting means and provided further that at least one of the following additional prerequisites is satisfied: (a) the torque transmission system should not be fully engaged, (b) the torque transmission system should not be fully disengaged, and (c) the transmission should be in reverse gear or in one of the forward gears.

In accordance with a modification, the control unit can reassume its normal operating mode upon termination of a temporary malfunction of one or more sensors and/or of one or more signal transmiting means and in the presence of at least one of (a) a full engagement of the torque transmission system, (b) a full disengagement of the torque transmission system, and (c) while the transmission is shifted into a neutral gear, i.e., a gear other than a forward gear or the reverse gear.

In accordance with another modification, the control unit can be set up to reassume the normal operating mode in response to a termination of the temporary malfunction of at least one sensor and/or at least one signal transmitting means and with a predetermined delay following such termination.

Still further, the control unit can be set up in such a way that it can reassume the normal mode in response to a termination of temporary malfunction of at least one sensor and/or at least one signal transmitting means and while the control circuit receives signals from at least one sensor other than the temporarily ineffective or defective or malfunctioning sensor or sensors. The at least one sensor can be at least one of the following: (a) a sensor which monitors the positions of the brake or brakes, (b) a sensor which generates a signal in response to detected presence of an operator (driver) in the motor vehicle (e.g., in response to signals from a sensor which is designed to transmit signals when the driver's seat is occupied) , (c) the at least one sensor which serves to monitor the positions of the gear selecting and/or shifting means, (d) a sensor which monitors the positions of at least one openable or closable door forming part of the motor vehicle (e.g., the door next to the driver's seat), (e) at least one sensor which serves to monitor the speed of the motor vehicle (such sensor can constitute a tachometer generator associated with a differential in that portion of the power train which extends from the output element of the transmission to the driven wheels of the motor vehicle), and (f) a sensor which constitutes or forms part of an electronic control circuit for the engine (as already mentioned above, such circuit can include means for starting, operating and/or arresting the prime mover).

Still further, the control circuit can be designed to reassume its normal operating mode upon or in response to a termination of temporary malfunction of one or more sensors and/or one or more signal transmitting means, and subsequent to reception of a fresh signal following the termination of the temporary malfunction or malfunctions. This fresh signal is preferably (or can be) transmitted by a sensor other than the at least one sensor which is prone to temporary malfunction. Such other sensor can be at least one of the following: (a) a sensor which monitors the position(s) of the brake or brakes, (b) a sensor which generates a signal in response to detected presence of an operator in the motor vehicle, (c) the at least one sensor which is arranged to monitor the positions of the gear selecting and/or gear shifting means, (d) a sensor which monitors the positions of at least one openable and closable door forming part of the motor vehicle, (e) at least one sensor which is arranged to monitor the speed of the motor vehicle, and (f) a sensor which constitutes or forms part of an electronic control circuit for the prime mover (such as an internal combustion engine).

The vehicle can further comprise additional sensors, such as a first additional sensor which transmits to the control unit signals denoting the (open, closed and partly open) positions of one or more doors, a second additional sensor which transmits to the control unit signals denoting the (open, closed and partly open) positions of the hood, and a third additional sensor which transmits to the control unit signals denoting the (open, closed or partly open) positions of the trunk of the motor vehicle. The control unit can be arranged to reassume its normal operating mode in response to a termination of temporary malfunction of one or more sensors and/or one or more signal transmitting means when the additional sensors transmit signals denoting that the door or doors, the hood and the trunk of the motor vehicle are closed.

The controlling means (e.g., the electronic circuit of the control unit) can comprise means for converting analog signals from one or more sensors into non-analog (such as digital or binary) signals. If the conversion takes place at the sensor which generates analog signals, the means for transmitting signals from such sensor to the control unit can comprise at least one bus. The converting means can comprise an electronic circuit, and such electronic circuit can be confined in the housing of the respective sensor or such sensor and the electronic converting circuit can be confined in discrete housings.

Another feature of the invention resides in the provision of a method of operating a power train which can be utilized in a motor vehicle wherein a fuel consuming prime mover (such as a combustion engine) which is arranged to be started, operated and arrested serves to transmit torque to a transmission which is shiftable into and from a plurality of (forward and reverse) gears in which the transmission tends to move the vehicle in response to at least partial engagement of an automated torque transmitting device (such as a friction clutch) which is controlled by a system including a signal receiving, processing and transmitting control unit, at least one actuator which is operable to select the magnitude of torque being transmitted by the clutch in response to processed signals from the control unit, and a plurality of sensors which are arranged to transmit signals to the control unit and at least one of which (or at least one signal transmitting connection between at least one sensor and the control unit) is prone to malfunction. The improved method comprises the step of changing, in response to malfunctioning of the at least one sensor and/or of the at least one signal transmitting connection) the mode of operation of the control unit from a normal or standard mode in which the transmission moves the vehicle in an at least partially engaged condition of the torque transmitting device, while the prime mover is in the process of transmitting torque to the torque transmitting device and while the transmission is in gear, to an emergency or standby mode in which the transmission is prevented from moving the vehicle while the transmission is in gear, the prime mover is operated and a member (such as a gas pedal) which is actuatable to increase the consumption of fuel by the prime mover is not actuated.

If the malfunction of the at least one sensor and/or of the at least one signal transmitting connection) is a temporary malfunction, the vehicle can be set in motion by way of the engaged torque transmitting device and the change-speed transmission, e.g., automatically upon elapse of a predetermined time interval following the termination of the malfunction.

The novel features which are considered as characteristic of the invention are set forth in particular in the appended claims. The improved power train itself, however, both as to its construction and the methods of assembling and utilizing the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 3 is a block diagram intended to facilitate the understanding of one mode of operation of the improved power train;

FIG. 4 is a block diagram denoting another mode of operation of the improved power train;

FIG. 5 is a block diagram denoting a third mode of operation of the improved power train; and FIG. 6 is a block diagram intended to denote a mode of operation departing from that denoted by the block diagram of FIG. 5.

DESCRIPTION OF PREFERRED EMBODIMENTS

Figure 1:
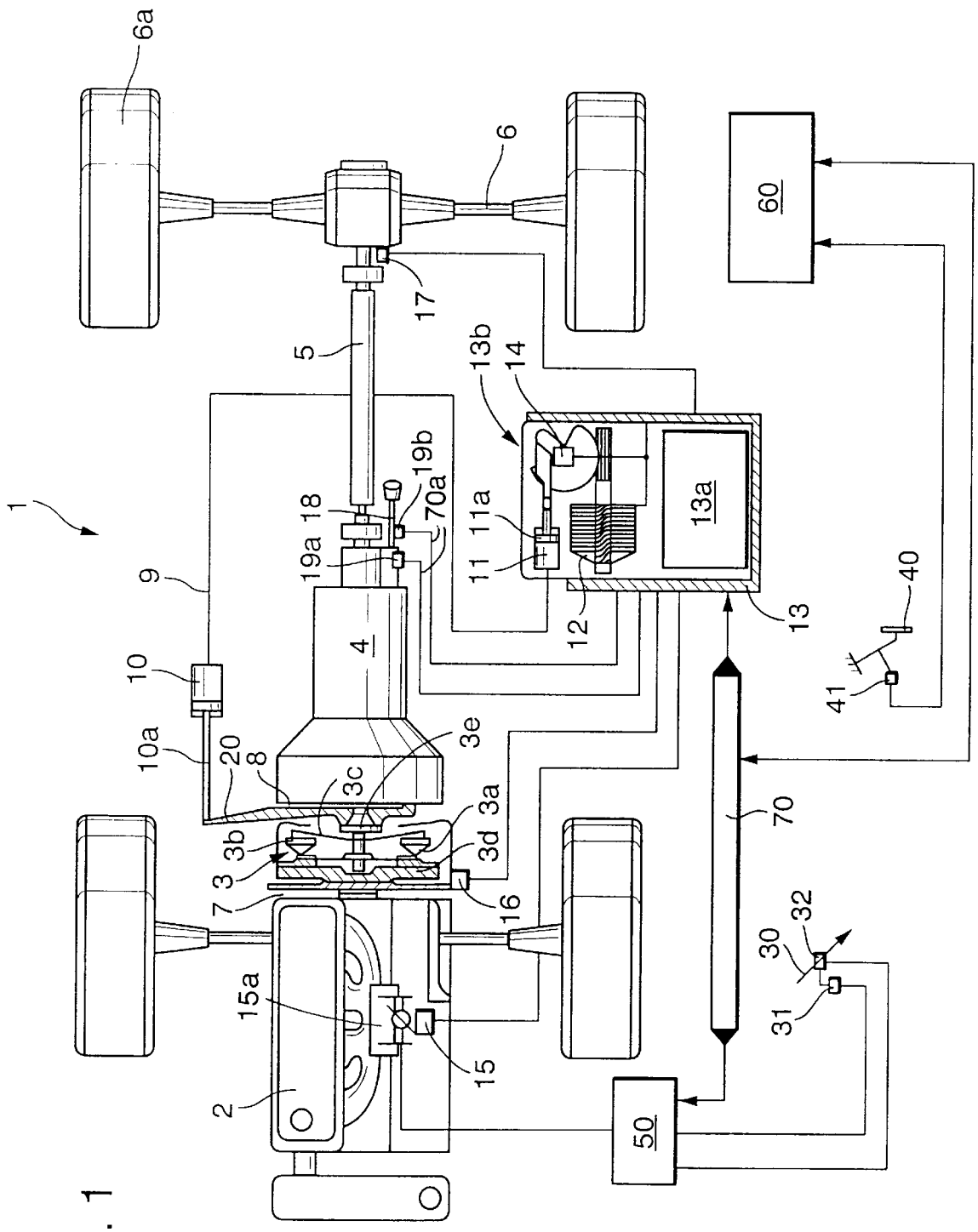
FIG. 1 is a schematic partly elevational and partly sectional view of a motor vehicle comprising a power train which embodies one form of the invention.

FIG. 1 shows a motor vehicle 1 having a power train which includes a prime mover 2 (such as a motor or an internal combustion engine). The illustrated prime mover 2 is a combustion, engine and its rotary output element (such as a camshaft or a crankshaft) transmits torque to the input side 7 of an automated torque transmission system 3 shown as a friction clutch having an output side arranged to transmit a variable torque to an input element (e.g., a rotary input shaft) of a transmission 4 which is shiftable into neutral, a reverse gear and any one of several (e.g., three or four) forward gears by a gear selecting and shifting member 18 (e.g., a lever which can be manipulated by the operator of the vehicle 1). The output shaft 5 of the transmission 4 can transmit torque to a differential which, in turn, can transmit torque to the axles 6 for the driven wheels 6a of the motor vehicle.

The illustrated automated friction clutch 3 can be replaced with a torque transmission system or device which is installed in the power train downstream of the transmission 4. Furthermore, though the clutch 3 of FIG. 1 is of the type disclosed, for example, in commonly owned U.S. Pat. No. 5,374,218 granted Dec. 20, 1994 to Wolfgang Reik et al. for "ASSEMBLY FOR COMPENSATION OF FLUCTUATIONS OF TORQUE", it is equally possible to employ any one of a plurality of other types of torque transmission systems or devices. For example, the clutch 3 can be replaced with a so-called dry friction clutch or by a lockup or bypass clutch of a hydrokinetic torque converter, e.g., of the type shown and described in commonly owned U.S. Pat. No. 5,377,796 granted Jan. 3, 1995 to Oswald Friedmann et al. for "APPARATUS FOR TRANSMITTING FORCE BETWEEN ROTARY DRIVING AND DRIVEN UNITS". It is also possible to employ a self-adjusting wear-compensating clutch of the type disclosed in commonly owned U.S. Pat. No. 5,409,091 granted Apr. 25, 1995 to Wolfgang Reik et al. for "AUTOMATICALLY ADJUSTABLE FRICTION CLUTCH", a start-up clutch, a safety clutch arranged to transmit an accurately selected torque, a torque converter, a wet friction clutch (with component parts immersed in a fluid, such as oil), or a combination of an infinitely variable transmission with clutches of the type disclosed, for example, in commonly owned U.S. Pat. No. 5,169,365 granted Dec. 8, 1992 to Oswald Friedmann for "POWER TRAIN". The disclosures of all U.S. patents (and allowed U.S. patent applications, if any) which are enumerated in this specification are incorporated herein by reference.

The illustrated transmission 4 is a manually operable change-speed gear or range gear (such as a multi-step reduction gear). However, it is also possible to employ an automated transmission, e.g., a transmission which is equipped with one or more actuators serving to select a particular gear and/or to shift into and from a selected gear. An automated transmission which can be utilized in the power train of the present invention can constitute a gearing wherein the shifting into a selected gear, such as by means of at least one actuator, must be preceded by an interruption of the pulling force. The pulling force need not be interrupted if the manual transmission 4 of FIG. 1 is replaced with an automatic transmission; such automatic transmissions normally employ planetary gearings. The transmission which is disclosed in the aforementioned U.S. Pat. No. 5,169,365 to Friedmann is an infinitely or continuously variable transmission (CVT) with an infinite number of driving or forward and reverse ratios.

The friction clutch 3 of FIG. 1 comprises parts which can transmit, or interrupt the transmission of, torque between the input and output sides 7 and 8. It comprises a flywheel 3d which is driven by the output element of the engine 2, a clutch disc 3a which can transmit torque to a rotary input element of the transmission 4, an axially movable pressure plate 3b, a clutch spring (here shown as a diaphragm spring) 3c which biases the pressure plate axially against the clutch disc 3a to thus urge the clutch disc 3a against the flywheel 3d when the clutch 3 is at least partially engaged, and means for engaging and disengaging (i.e., for changing the condition of) the clutch.

The engaging/disengaging means for the clutch 3 comprises an axially movable bearing 3e which can tilt the diaphragm spring 3c to thus reduce the magnitude of torque which can be transmitted by the clutch 3. The bearing 3e can receive motion from the prongs of the diaphragm spring 3c or from the prongs or tines of a preferably bifurcated lever 20 which, in turn, is pivotable by an actuator 13b by way of a fluid-operated motion transmitting connection including a hydraulic master cylinder 11 having a piston 11a coupled to the actuator 13b and a slave cylinder 10 connected with the master cylinder 11 by a hydraulic conduit 9 and having a piston rod 10a articulately connected to the lever 20.

The actuator 13b forms part of a system or assembly which controls the operation of the automated friction clutch 3 and further includes an electronic control unit 13, a plurality of sensors (such as those shown at 14, 15, 16 and many others) as well as means (such as one or more buses 70 and cables and/or other electrical conductors 70A) for transmitting signals from the sensors to the circuit 13a of the control unit 13. The circuit 13a processes signals which are transmitted by the sensors, and the thus processed signals are utilized to select the condition of the clutch 3 by way of the actuator 13b and hydraulic connection 11, 9, 10.

FIG. 1 shows that the electronic circuit 13a and the actuator 13b are confined in a common housing or casing, such as the housing or casing of the control unit 13. However, it is equally within the purview of the instant invention to employ discrete housings or casings for the actuator 13b and the circuit 13a. The illustrated arrangement is preferred at this time because of its space-saving design.

The actuator 13b comprises at least one driving component 12 (such as an electric motor) which receives processed sensor signals from the circuit 13a. The component 12 drives a gearing of the actuator 13b, and the gearing can displace the piston 11a of the master cylinder 11 in the fluid-operated connection 9–11 between the control unit 13 and the lever 20. The gearing of the actuator 13b can include a worm gear drive, a spur gearing, a bevel gearing, a feed screw which mates with a nut, a crank drive, or a linkage. For example, a linkage in lieu of the gearing can serve to transmit motion from the motor 12 directly to the portion 11a of the master cylinder 11.

The position of a mobile component of the illustrated gearing between the motor 12 and the piston 11a of the master cylinder 11 is monitored by the aforementioned movement-detecting sensor 14 which transmits to the electronic circuit 13a signals denoting the axial position of the piston 11a and hence the inclination of the lever 20, i.e., the condition of (full or partial engagement or disengagement of) the automated clutch 3. The sensor 14 can also serve to monitor the speed and/or the acceleration and/or the distance covered by the monitored component or components of the gearing between the motor 12 and the master cylinder 11.

The conduit 9 can confine a supply of a hydraulic or pneumatic fluid. When the electronic circuit 13a ascertains that an adjustment of the condition of the automated clutch 3 is necessary, it transmits an appropriate electronic signal to the motor 12 which causes the operative connection including the gearing of the actuator 13b and the parts 9–11 to change the angular position of the lever 20, i.e., the axial position of the bearing 3e and hence the bias of the diaphragm spring 3c upon the pressure plate 3b which then causes the clutch disc 3a to share all angular movements of the clutch 3 (clutch 3 fully engaged), to rotate the input element of the transmission 4 but to slip relative to the flywheel 3d and pressure plate 3b (clutch partly engaged), or to remain at a standstill (clutch disengaged).

The electric motor 12 can be replaced with another suitable driving unit for the gearing of the actuator 13b without departing from the spirit of the invention. For example, the motor 12 can be replaced with a fluid-operated (hydraulic or pneumatic) driving unit or with a magnetic (such as electromagnetic) drive, as long as the selected drive can effect an adjustment of the lever 20 which reflects the intensity and/or other characteristics of the (processed) signal or signals being transmitted by the circuit 13a.

The clutch 3 can be designed to transmit torques of a magnitude exceeding the then prevailing output torque of the engine 2. An advantage of such engine-clutch combination is that the clutch can transmit the entire engine torque but enables the power train to absorb or eliminate torque peaks which could adversely affect the comfort to the occupant (driver) or occupants of the motor vehicle 1. Reference may be had again to U.S. Pat. No. 5,374,218 to Reik et al. which discloses suitable torsion damping means between the engine and the transmission of a power train for use in a motor vehicle.

The electronic circuit 13a of the control unit 13 receives signals from the aforementioned sensor 14 (such signals denote the condition of the clutch 3, i.e., the magnitude of the torque which the clutch disc 3a transmits to the rotary input element of the transmission 4). FIG. 1 further shows several additional sensors which transmit signals to the corresponding inputs of the circuit 13a. Such additional sensors include the aforementioned sensor 15 which monitors the position (angle) of a normally pivotable element (such as a flap) of a customary throttle valve 15A associated with the engine 2. The aforementioned sensor 16 serves to monitor the RPM of an output element of the engine 2, e.g., by monitoring the RPM of the flywheel 3d which is driven by the engine 2. The sensors 14, 15 and 16 (and/or numerous additional sensors some of which will be described hereinafter) can be set up for intermittent (such as regularly recurring) or uninterrupted transmission of signals to the electronic circuit 13a of the control unit 13.

The character 50 denotes another sensor, namely an electronic engine circuit which can control the starting, the operation and the stoppage of the engine 2. The circuit 50 can transmit signals (such as those denoting the timing of ignition, the timing of fuel injection and/or the quantities of fuel being supplied to the engine 2) to the circuit 13 by way of a bus 70. The bus 70, or another signal transmitting device (e.g., electrical conductor means corresponding to those shown at 70A), can also serve to transmit signals from the circuit 13a to the circuit 50.

A circuit or sensor 60 for an antiblock system (ABS) is connected with a sensor 41 for the position of one or more brakes 40 as well as with the circuits 13a, 50 (by way of the bus 70). The circuit 60 can be further connected with a suitable antislip regulator (ASR). It is also possible to provide discrete circuits 60, one for the antiblock system (ABS) and the other for the antislip regulator (ASR).

A sensor 17 is located at the differential between the axles 6 to ascertain the rotational speed of a component part and to thus enable the circuit 13a to calculate or to otherwise ascertain the speed of movement of the vehicle 1.

A sensor 31 is associated with the gas pedal (fuel consumption regulator) 30 of the engine 1. A second sensor 32 is designed to transmit signals denoting that the pedal 30 is not depressed, i.e., that the engine 2 is idling; thus, this sensor generates or can generate a signal when the engine 2 is running but the gas pedal 30 is not depressed, and the sensor 31 transmits or can transmit signals denoting the extent of depression of the gas pedal. The sensor 32 transmits no signals when the circuit 13a receives signals from the sensor 31.

The sensor 41 can monitor the position of the brake pedal 40. An analogous sensor can be provided to generate signals when a second brake (not specifically shown), such as a parking brake, is activated by the operator of the motor vehicle 1.

The bus 70 can constitute a CAN bus. The conduits 70A (e.g., in the form of cables) can be utilized to transmit signals to the circuit 13a, 50 and/or 60 from all such sensors (e.g., 19a, 19b) which are not associated with buses.

The sensors 19a, 19b are associated with the transmission 4. For example, one of these sensors (such as 19a) can monitor the positions of the member 18 to transmit signals which denote the selection of a particular gear, and the other sensor (such as 19b) can generate signals denoting actual shifting of the transmission 4 into or from a particular gear. Furthermore, at least one of these sensors can be responsive to the magnitude of forces which are being applied thereto by the hand of an operator of the vehicle 1 to thus indicate that the operator is present and/or that the operator intends to shift into or from a particular gear or is in the process of selecting a gear or is in the process of shifting into or from a selected gear.

The circuit 13a can evaluate the signals from the sensors 19a, 19b (via conductors 70A) to ascertain the speed and/or the extent and/or the direction of movement of the member 18 to thus recognize the selection of a particular gear and/or the shifting into or from such particular gear of the transmission 3 and/or an operator's intent to shift into neutral, into a forward gear or into the reverse gear.

The circuit 13a can include or constitute a suitable computer having one or more outputs serving to transmit to the motor 12 signals which serve to effect an appropriate selection of the condition of the automated clutch 3.

The member 18 can be utilized to shift the transmission 4 from any one of the forward gears or from reverse gear into neutral or from neutral into any one of the forward and reverse gears. One of the sensors 19a, 19b can be provided directly on the member 18, and the other of these sensors can be installed adjacent the path of movement of the member 18 into or from a selected (forward or reverse) gear of the transmission 4.

The arrangement is preferably such that the circuit 13a of the control unit 13 is at least temporarily connected with all of the sensors (including, for example, the sensors 14, 15, 16, 17, 19a, 19b, the circuits 60, 70 and others, if any) and with the signal transmitting means (such as 70, 70A) during each of a series of successive cycles. Thus, and depending on the actual operating point, the circuit 13a can repeatedly transmit to the motor 12 processed signals which serve to adjust the automated clutch 3 in a sense to ensure that the connection between the output element of the engine 2 and the input element (clutch disc 3a) of the transmission 4 invariably transmits a desired optimum torque (including zero torque). To this end, the circuit 13a of the control unit 13 contains a control program in the form of hardware and/or software. Such program evaluates the incoming signals, and each evaluation can involve a comparison and/or a reliance on functions and/or characteristic fields to furnish output signals which are transmitted to the motor 12 for the gearing or links or levers or fluid-operated motor means between the circuit 13a and the lever 20 of the means for selecting the condition of the automated clutch 3.

For example, the control unit 13 can comprise a torque determining assembly or subunit for the clutch 3, a gear selecting assembly or subunit for the member 18 of the transmission 4, and/or a mode determining or selecting assembly or subunit. Alternatively, the control unit 13 can be connected with at least one of such assemblies or subunits in a manner to transmit signals thereto and/or to receive signals therefrom. These assemblies or subunits can be implemented by programs in the form of hardware and/or software in such a way that the incoming sensor signals induce the circuit 50 to select an optimum engine torque and that the incoming sensor signals induce the circuit 13a to select the required extent of slip (i.e., the extent of engagement or disengagement) of the automated clutch 3, and/or (if the transmission 4 is automated) to select an optimum gear for the automated transmission. Such adjustments render it possible to select the actual operating condition of the motor vehicle 1, and more particularly of its power train. The sensor 19a and/or 19b informs the control unit 13 of the selected gear of the transmission 4, of the intent to shift into or from a particular gear, and/or of actual shifting into reverse gear, into one of the forward gears, or into neutral. For example, the transmission 3 can comprise a customary control shaft or rod which is movable (by the member 18) axially to select a particular gear and which is turnable (clockwise and counterclockwise, again by the member 18) to actually shift the transmission into or from neutral, into or from a reverse gear, or into or from a particular forward gear. The sensor 19a and/or 19b can transmit signals denoting the magnitude of the force being applied to the member 18, the axial position of the aforementioned shaft or rod, and/or the angular position of such shaft or rod, the speed of movement of the member 18 and/or central shaft or rod, the rate of acceleration of such movable part or parts and/or the extent of displacement of such mobile part or parts.

At least the sensors 32 and 41 can constitute digital sensors, e.g., in the form of switches. For example, the sensor 41 can be designed to transmit two types of signals, namely that the brake 40 is on or is not actuated. These signals can be transmitted to a standard brake lamp which lights up when the brake is actuated and emits no light (or a different light) when the brake is idle. Such arrangement can be resorted to regardless of whether the member 40 is a vehicle brake or a parking brake, or is representative of both such brakes.

Alternatively, at least the sensor 41 can constitute an analog sensor (such as a potentiometer) which can be utilized to transmit signals denoting the extent (including zero) of application of the vehicle brake and/or the parking brake. As shown in FIG. 1, the sensor 41 is connected with the circuit 13a of the control circuit 13 by the aforementioned bus 70. The ABS circuit 60 can transmit (to the sensor 41 and/or to the circuit 13a) signals denoting the desirability or lack of desirability of application of the brake 40 and/or the desired or optimum extent of application of one or both or all brakes.

The control unit 13 has a standard or normal operating mode when the sensors (including the circuits 50, 60) and the signal transmitting connections (70, 70A) function properly. In accordance with such standard or normal mode, the output shaft 5 of the transmission 4 causes the axles 6 to rotate the wheels 6a so that the motor vehicle 1 carries out a creeping or crawling movement when the engine 2 is on, the clutch 3 is at least partially engaged to transmit a certain torque from the flywheel 3d to the clutch disc 3a (i.e., to the input shaft of the transmission 4), the transmission 4 is in gear (namely in one of the forward gears or in reverse gear), and the gas pedal 30 is not depressed (i.e., the sensor 32 transmits a signal indicating that the engine 2 is idling). For example, the crawling or creeping speed of the engine 2 can be in the range of 1–3 miles, i.e., a normal or average walking speed.

The circuit 13a of the control unit 13 is designed to shift the control unit from the just described standard or normal operating mode to an emergency or standby operating mode in response to detection of a malfunctioning of at least one sensor and/or in response to a malfunctioning (e.g., breakage) of at least one of the signal transmitting means (such as 70 and/or 70A). The malfunctioning can involve a temporary (e.g., short-lasting) failure or an irreversible (permanent) breakdown of the affected sensor(s) and/or signal transmitting means. When the control unit 13 operates in accordance with the emergency mode, the vehicle 1 cannot crawl or creep when (a) the engine 2 is idling (i.e., when the gas pedal 30 is not depressed but the engine 2 is on), and (b) the transmission is in (reverse or a forward) gear because the adjustment of the automated clutch 3 is then such that the flywheel 3d cannot transmit torque to the clutch disc 3a (i.e., to the input element of the transmission).

Figure 2:
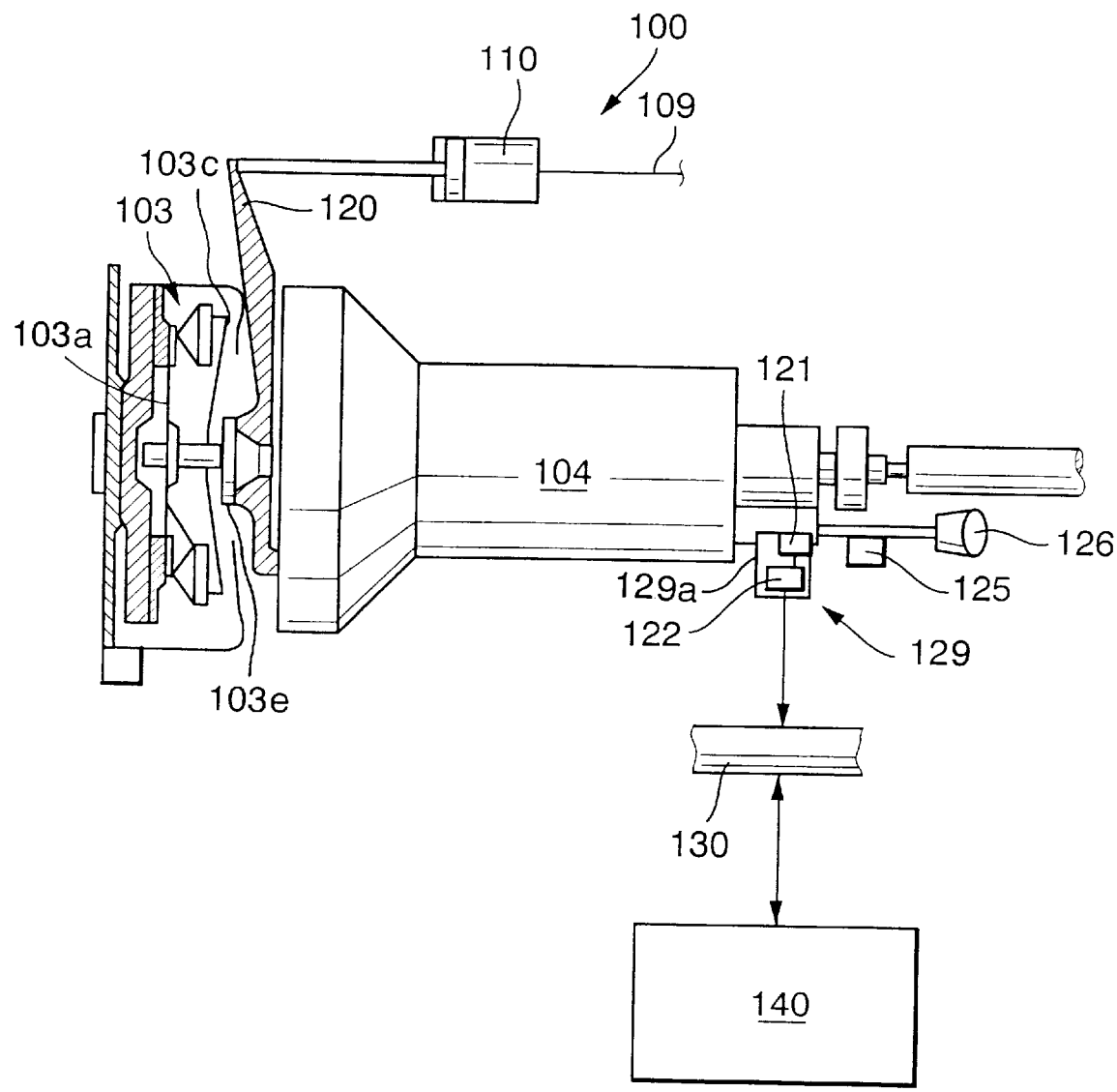
FIG. 2 is an enlarged fragmentary schematic partly elevational and partly sectional view of a modified power train.

FIG. 2 shows a portion of a modified power train 100. The clutch 103 is (or can be) identical with the clutch 3 in the power train of FIG. 1, and its bearing 3e can be shifted axially by the diaphragm spring 103c or by the lever 120. The latter is pivotable by the piston of a slave cylinder 110 which is connected with a master cylinder (not shown) by a conduit 109. The clutch disc 103a can transmit torque to the input element of a manually shiftable transmission 104 when the clutch 103 is at least partially engaged and the prime mover (not shown in FIG. 2) is on. The character 126 denotes a pivotable and/or otherwise movable gear selecting and/or shifting member corresponding to the member 18 of the transmission 4 shown in FIG. 1.

A first sensor 129 is provided to replace the sensor 19a of the control assembly shown in FIG. 1, and a further sensor 125 is provided to replace (or to perform the functions of) the sensor 19b, i.e., to monitor one or more parameters (such as the speed of movement, the direction of movement, the extent of movement, the actual position and/or magnitude of applied force) of or to the lever 126. The signals from the sensor 125 can be interpreted as denoting the presence of an intention by the operator of the motor vehicle to shift the transmission 104 into or from a selected gear. Such (intention ascertaining) function can also be carried out by the sensor 129 (in addition to or in lieu of the sensor 125).

FIG. 2 shows that the electronic circuit 122 and the actual sensor element (monitoring element) 121 of the sensor 129 are confined in a common housing or casing 129a. However, it is equally possible to provide two discrete housings (one for the element 121 and the other for the circuit 122) and to provide a signal transmitting connection (such as 70 or 70A) between the two housings.

Fo example, the element 121 (such as a potentiometer) can be designed to transmit analog signals to the circuit 122, and the latter can comprise means for converting such analog signals into non-analog (such as digital or binary) signals which are transmitted to the electronic circuit of the control unit 140 (corresponding to the control unit 13 of FIG. 1) by a bus 130 or in any other suitable way. Signals from the element 121 can be converted and/or amplified in the circuit 122 and/or in the electronic circuit of the control unit 140. In other words, an amplification of (analog) signals from the sensor element 121 can take place prior or subsequent to conversion (into non-analog signals), i.e., at 122 or at 140. Still further, the circuit 122 and/or the signal transmitting means can convert signals (such as analog signals) from the element 121 into data bus signals. Thus, the housing 129a can serve to accommodate (a) the actual signal generating (monitoring) element 121, (b) the circuit 122 which can convert analog signals into non-analog (such as digital) signals (i.e., the circuit 122 can include or constitute an A/D converter), (c) a discrete A/D converter, (d) means for converting analog or digital signals into data bus signals, and (e) a signal amplifier. All such constituents in the housing 129a can be assembled into an integrated module (IC), such as an application specific integrated module (ASIC).

The signals from the circuit 122 to the signal processing circuitry of the control unit 140 can be provided with identifying indicia denoting the origins of such signals (i.e., the element 121) and/or their intensity and/or other parameters; this renders it possible to employ the bus 130 for the transmission of signals from two or more sources.

Each of the sensors 19a, 19b, 126, 129 can constitute or include means for monitoring the distances covered by the respective member 18 or 126 (or another mobile part of the transmission 4 or 104), means for monitoring the speed of movement of a mobile part of the transmission 4 or 104, and/or means for monitoring the force being applied to such mobile part. For example, at least one of the sensors 19a, 19b, 126, 129 can include or constitute a potentiometer, a Hall effect modulator or amplifier, an inductive sensor, a capacitive sensor, a magnetoresistive sensor, a contactless sensor, or a discrete monitoring sensor (such as an optical sensor). As already stated hereinbefore, the sensor 19a, 19b, 126 and/or 129 can also constitute a velocity and/or force monitoring means.

The block diagram 200 of FIG. 3 is indicative of one presently preferred mode of operating the improved power train for the purpose of regulating the torque being transmitted by the automated clutch 4 or 104. The routine is started at 201, and the block 202 denotes a determination (such as by the control unit 13 of FIG. 1) whether or not at least one of the sensors (14, 15, 16, 17, 19a, 19b, ...) and/or signal transmitting means (70, 70A) is defective. For example, such a determination of the presence or absence of a defective sensor and/or a defective signal transmitting means (or of a sensor and/or a signal transmitting means which is totally out of commission) can be achieved by ascertaining the presence or absence of signal transmitting paths between each of the sensors and the control circuit 13a. Alternatively, or in addition to the just outlined step, it is possible to ascertain whether or not the intensities and/or other characteristics of all signals are within an acceptable range (i.e., a range which is indicative of a satisfactory sensor and of a satisfactory connection between the sensor and the circuit 13a). Receipt of such information enables the circuit 13a to generate a signal denoting that all of the sensors and all of the signal transmitting means operate satisfactorily, or that at least one sensor and/or at least one signal transmitting means is out of commission.

If there is no defect, the search for defects is terminated and the cycle is terminated, as at 205. However, if the circuit 13a detects the existence of a defect, the control unit 13 is caused to switch to the emergency mode (block 203). This means that the control unit 13 prevents a creeping or crawling movement of the motor vehicle 1 (note the block 204) while the engine 2 is idling (i.e., the gas pedal is not depressed), and the transmission is shifted into reverse gear or into one of the forward gears. In other words, the control unit 13 then maintains the clutch 3 in the fully disengaged condition (the flywheel 3d and the pressure plate 3b rotate relative to the clutch disc 3a and the input element of the transmission 4). The cycle is terminated at 205.

The routine of FIG. 3 is repeated cyclically and the vehicle is held against creeping movement as long as the circuit 13a continues to detect a defect in at least one of the sensors and/or in at least one of the signal transmitting means. By way of example, the routine can be repeated at intervals of between 1 millisecond and 1000 ms, preferably between 5 ms and 50 ms.

The diagram 300 of FIG. 4 illustrates a second routine which is repeated at selected intervals. This routine is started at 301, and the block 302 denotes the step of ascertaining the presence or absence of a defective sensor and/or a defective signal transmitting means. The cycle is terminated at 306 if the step denoted by the block 302 fails to reveal the presence or existence of a defect or malfunction. The block 302 can also denote a procedure which involves a determination whether or not the emergency mode wich has been set up during a preceding cycle is still in effect. If the preceding cycle involved a determination or a renewed determination of the presence of a defect or malfunction, the control unit 13 (or 140) can set a status (condition) bit or byte. Once this has taken place, the clutch 3 or 103 is operated in accordance with the emergency mode, i.e., the vehicle is prevented from carrying out a crawling or creeping movement while the engine 2 is idling (i.e., the gas pedal 30 is not depressed) and the transmission is shifted into reverse gear or one of the forward gears.

The operation in accordance with the emergency mode is terminated (at 306) if the step denoted by the block 302 fails to indicate the presence of a defect or malfunction (i.e., of a defective sensor and/or a defective signal transmitting means).

The block 303 denotes the step of ascertaining (as at 202 in the diagram 200 of FIG. 3) the presence or absence of a defective sensor and/or a defective signal transmitting connection. If the answer is in the affirmative, the routine is terminated at 306. If the examination at 303 reveals the absence of one or more defects or malfunctions, this indicates that the defect or malfunction (detected during a preceding cycle, as at 302) no longer exists, i.e., that the malfunctioning of one or more sensors and/or signal transmitting means was temporary. The next step then involves a delay $t_{max}$ for a preselected interval of time. Once such an interval has expired, the control unit 13 is reset (see the block 305) to normal or standard mode, and the cycle is terminated at 306. The step denoted by the block 304 can involve starting a timer as soon as the circuit 13a detects the absence of a defect subsequent to the preceding detection of a defect, and the step 305 (i.e., resetting the control unit 13 to the normal operating mode) is carried out as soon as the interval $t_{max}$ has expired. This means that the control unit 13 can select a certain engagement of the clutch 3 so that the vehicle 1 can crawl while the engine 2 is idling and the transmission 4 is shifted into reverse gear or into one of the forward gears.

The diagram 320 of FIG. 5 shows a routine which is started at 321 and involves a regulation of torque being transmitted by the clutch, such as the clutch 3 of FIG. 1. The block 322 denotes the step of ascertaining whether or not the preceding cycle involved, and the actual cycle involves, an operation in accordance with the emergency mode. If the result of the examination at 322 is positive, the control unit sets a status bit or byte. The clutch 3 is operated in accordance with the emergency mode, i.e., the vehicle is prevented from carrying out a creeping movement while the engine 2 is idling and the transmission 4 is in reverse gear or in a forward gear.

If the inquiry at 322 is answered in the negative, the routine is terminated at 326.

The block 323 denotes the step of ascertaining the presence of a defective sensor and/or a defective signal transmitting connection if the inquiry at 322 is answered with a "YES", i.e., this step involves a determination whether or not at least one sensor and/or at least one motion transmitting connection is still defective. In the case of an affirmative answer, the routine is terminated at 326. If the answer at 323 is "NO", the next step (block 324) involves a determination of the presence or absence of a signal denoting that the operator is in the vehicle 1. If the answer at 324 is in the affirmative, the next step (block 325) involves a shifting of control unit 13 from emergency mode back to the standard or normal operating mode. For example, a signal (at 324) that the driver is actually in her or his seat indicates that the driver is indeed in control of and operates the vehicle.

Another signal denoting that an operator is present in the vehicle is obtainable from the sensor 41 when the latter transmits a signal denoting that the brake 40 is being actuated. Furthermore, such signal can be generated by the sensor 31 and/or 32 when at least one of these sensors indicates that the gas pedal is being actuated. Still further, the vehicle 1 can be provided with one or more customary sensors which transmit to the control circuit 13a signals denoting whether or not one or more doors (such as the door next to the driver's seat) are closed. Still further, the circuit 13a can receive a signal from the sensor 17 that the speed of the vehicle 1 exceeds a crawling or creeping speed and this, too, is a reliable indication that the operator is actually in charge of driving the vehicle. Still further, the ignition frequency of the engine (a signal from the circuit 50) can also indicate the presence of an operator. Last but not least, the circuit 13a can be designed to process two or more of the aforeenumerated signals in order to generate a signal which is a highly reliable indicator that the vehicle is indeed operated by a driver.

If a signal denoting the existence of at least one defective sensor and/or of at least one defective signal transmitting connection no longer exists (note the arrow "NO" between the blocks 323 and 324 in the diagram 320 of FIG. 5), and the investigation at 324 indicates the presence of an operator, the circuit 13a shifts the control unit 13 back to the standard mode (block 325) so that the vehicle 1 begins to crawl if the engine 2 is idling and the transmission is in a gear other than neutral.

FIG. 6 shows a diagram 330 of a routine which is started at 331 and can be terminated at 336. The block 332 is indicative of an inquiry to ascertain whether or not the control unit 13 operates in an emergency mode; such emergency mode could have been set up during a preceding cycle and could have entailed the setting of a status bit or byte. If the inquiry at 332 indicates the absence of an emergency mode, the routine is terminated, as at 336. If the inquiry at 332 indicates the existence of an emergency mode during the preceding cycle, the next step (at 323) involves a determination whether the cause for an emergency mode still exists; if the answer is "YES", the cycle is terminated at 336. If the answer is "NO", the next step (see the block 334) involves a determination regarding the condition of the clutch 3 (engaged or disengaged) and/or whether the transmission 4 is in neutral. If one of the inquiries at 334 is answered in the affirmative, the next step (block 335) involves a shift back to the normal or standard mode; if the answer at 334 is "NO", the cycle is completed at 336.

It will be noted that the inquiry at 334 serves to ascertain whether or not the setting (such as full engagement or full disengagement) of the clutch 3 is a positive or stable setting as well as whether or not the transmission 4 is capable of transmitting any torque (such torque transmission is evidently impossible if the transmission is in neutral). A shifting (at 335) back to standard mode takes place if at least one of the constituents 3, 4 of the power train is in a condition in which it cannot transmit torque.

The transmission 4 is in neutral in all positions of the mobile member 18 in which the transmission has been shifted out of or is yet to be shifted into one of the reverse and forward gears. This also includes the synchronizing positions for the forward and reverse gears. Alternatively, the synchronizing positions can be excluded so that, basically, shifting into neutral gear merely involves those movements of the member 18 which include a selection of the reverse gear or one of the foward gears.

For example, and assuming that the failure of a particular sensor was only temporary, and the circuit 13a ascertains that such failure no longer exists while the clutch 3 is fully engaged or fully disengaged and/or that the transmission 4 is in neutral or has been shifted into one of the reverse and forward gears, the circuit 13a initiates a shift back to the standard mode of operation of the control unit 13. This means that, if the engine is on and is idling (i.e., the gas pedal 30 is not depressed), and the transmission is in one of the reverse and forward gears, the control unit 13 causes the clutch 3 to assume a condition in which the vehicle 1 is crawling, i.e., the clutch is partially (or sufficiently) engaged so that it can transmit a torque which is necessary to ensure that the vehicle can crawl at a low speed.

A defectiveness of one or more signal transmitting means (such as the bus 70) can be detected by monitoring the signals from such signal transmitting means. For example, if the bus 70 fails to transmit a signal within a certain interval of time (such as an interval within the range of a few milliseconds, e.g., between 10 ms and 500 ms), it is safe to conclude that the bus 70 is out of commission.

As far as the condition of the sensor 19a and/or 19b is concerned, if a bus (such as a CAN bus, not shown in FIG. 1) between the sensors 19a, 19b on the one hand and the circuit 13a on the other hand transmits a "defect" signal, such signal can be interpreted by the circuit 13a to ascertain whether or not it is typical of a defective sensor 19a and/or 19b.

Still further, a sensor or a signal transmitting connection can be classified as being defective if it transmits a signal having an intensity or another characteristic which is outside of a range denoting signals from a satisfactory sensor or a satisfactory signal transmitting connection. This can happen, for example, if a cable breaks, if a sensor is short-circuited and/or if a sensor and/or a connection is otherwise defective to an extent which warrants a shifting of the control unit 13 into a standby or emergency mode.

The control unit 13 or 140 can be designed to carry out a control operation with an open control path with or without adaption. Alternatively, the control unit can rely on a control with a closed path and feedback. Still further, it is also possible to rely on an operation involving a control mode with adaption and a regulating mode.

An important advantage of the improved power train and of the method of operating it is that, by depressing or not depressing the gas pedal, the operator of the vehicle ensures that the control unit can automatically select the optimum operating mode. Thus, a creeping or crawling of the motor vehicle can be prevented when one or more sensors and/or one or more signal transmitting connections are defective, but the creeping or crawling operation can be regulated in the normal operating mode of the vehicle.

Moreover, when the control unit operates in the emergency mode, the operator of the motor vehicle can depress the gas pedal in order to regulate the torque which can be transmitted by the automated clutch as a function of one or more parameters of the motor vehicle so that the vehicle can be set in motion. As already explained hereinbefore, such parameters can include the RPM of a rotary component of the engine, the engine torque, the angle of the pivotable member of the throttle valve, the extent of depression of the gas pedal, the timing of ignition, the timing of fuel injection, the quantity of injected fuel, the RPM of a rotary component of the transmission, the speed of the motor vehicle, the selected (reverse or forward) gear of the transmission, the (actuated or idle) condition of the brake or brakes, and the difference between the engine RPM and the transmission RPM.

It is preferred to design the control unit in such a way that it cannot shift from emergency mode back into the normal or standard mode while any one of numerous additional sensors is caused to transmit a signal. For example, such additional or auxiliary sensors can include a sensor which transmits a signal when at least one door of the motor vehicle is open, a sensor which transmits a signal when the trunk of the vehicle is open, and/or a sensor which transmits a signal when the hood of the vehicle is open. The exact design of such sensors (e.g., electric switches) forms no part of the present invention.

Without further analysis, the foregoing will so fuly reveal the gist of the present invention that others can, by applying current knowledge, readily adapt it for various applications without omitting features that, from the standpoint of prior art, fairly constitute essential characteristics of the generic and specific aspects of the above outlined contribution to the art of power trains for motor vehicles and, therefore, such adaptations should and are intended to be comprehended within the meaning and range of equivalence of the appended claims.

What is claimed is:

1. A power train for use in a motor vehicle, comprising:
   a prime mover;
   means for starting, operating and arresting said prime mover;
   a transmission arranged to receive torque from said prime mover and being shiftable into and from a plurality of gears in which said transmission tends to move the vehicle, said transmission including multiple-position means for selecting gears and for shifting into and from selected gears;

an automated system arranged to transmit torque from said prime mover to said transmission and having engaged and disengaged conditions; and means for controlling said system, including a signal receiving, processing and transmitting control unit, an actuator arranged to select the magnitude of torque being transmitted by said system in response to processed signals from said control unit, a plurality of signal generating sensors, and means for transmitting signals from said sensors to said control unit, said sensors and said signal transmitting means being prone to malfunction and said control unit having a normal operating mode when said sensors and said signal transmitting means function properly, when said transmission receives torque from said system and when said transmission is shifted into one of said gears to thus move the vehicle, said control unit further having an emergency operating mode which is set up in response to malfunctioning of at least one of said sensors and said signal transmitting means and in which the vehicle is not set in motion while said prime mover is in operation and said transmission is shifted into one of said gears.

2. The power train of claim 1, wherein said prime mover comprises a fuel-consuming combustion engine and the vehicle comprises a multi-position throttle valve associated with the engine, a multi-position fuel consumption regulator associated with the engine, and at least one multi-position brake, said sensors including a sensor arranged to monitor the positions of said throttle valve, at least one sensor arranged to monitor the positions of said regulator, and at least one sensor arranged to monitor the positions of said gear selecting and shifting means.

3. The power train of claim 2, wherein said sensors further comprise at least one sensor arranged to monitor the positions of said at least one brake.

4. The power train of claim 2, wherein said sensors further comprise an electronic circuit for said engine, said circuit including at least one of said starting, operating and arresting means.

5. The power train of claim 2, wherein the vehicle comprises antiblocking means for said at least one brake and said sensors further comprise an electronic circuit for said antiblocking means.

6. The power train of claim 2, wherein said means for transmitting signals to said control unit comprises at least one bus.

7. The power train of claim 2, wherein said means for transmitting signals to said control unit comprises electrical conductor means.

8. The power train of claim 2, wherein the positions of said fuel consumption regulator include an idle position and the vehicle performs a crawling movement in said normal operating mode of said control unit while said regulator assumes said idle position.

9. The power train of claim 2, wherein said positions of said fuel consumption regulator include an idle position and the vehicle is not set in motion in said emergency operating mode of said control unit while said regulator assumes said idle position.

10. The power train of claim 9, wherein said transmission is arranged to set the vehicle in motion in the emergency mode of said control unit in response to movement of said regulator from said idle position.

11. The power train of claim 10, wherein the vehicle is set in motion in the emergency mode of said control unit and in response to movement of said regulator from said idle position in dependency upon at least one of a plurality of variable parameters of the vehicle.

12. The power train of claim 11, wherein said parameters include at least one of: the RPM of the engine, the angle of a pivotable component of said throttle valve, the torque being transmitted by the engine, the position of said fuel consumption regulator, the timing of ignition of the engine, the timing of fuel injection into the engine, the quantity of fuel being supplied to the engine, the RPM of a rotary component of said transmission, the speed of the vehicle, the selected gear of said transmission, the position of said at least one brake, and the difference between the engine RPM and the transmission RPM.

13. The power train of claim 2, wherein at least one of said sensors and said signal transmitting means is prone to temporary malfunction and said control unit is arranged to reassume said normal mode in response to a termination of said temporary malfunction in the absence of at least one of (a) a full engagement of said system, (b) a full disengagement of said system, and (c) a shifting of said transmission out of gear.

14. The power train of claim 2, wherein at least one of said sensors and said signal transmitting means is prone to temporary malfunction and said control unit is arranged to reassume said normal mode in response to a termination of said temporary malfunction in the presence of at least one of (a) a full engagement of said system, (b) a full disengagement of said system, and (c) while said transmission is shifted into a neutral gear.

15. The power train of claim 2, wherein at least one of said sensors and said signal transmitting means is prone to temporary malfunction and said control unit is arranged to reassume said normal mode in response to a termination of said temporary malfunction and with a predetermined delay following such termination.

16. The power train of claim 2, wherein at least one of said sensors and said signal transmitting means is prone to temporary malfunction and said control unit is arranged to reassume said normal mode in response to a termination of said temporary malfunction and while receiving signals from at least one sensor other than said at least one of said sensors.

17. The power train of claim 16, wherein said at least one other sensor is at least one of (a) a sensor which monitors the positions of said at least one brake, (b) a sensor which generates a signal in response to detected presence of an operator in the motor vehicle, (c) said a least one sensor which is arranged to monitor the positions of said gear selecting and shifting means, (d) a sensor which monitors the positions of at least one openable and closable door forming part of the motor vehicle, (e) at least one sensor arranged to monitor the speed of the motor vehicle, and (f) a sensor constituting or forming part of an electronic control circuit for said engine.

18. The power train of claim 2, wherein at least one of said sensors and said signal transmitting means is prone to temporary malfunction and said control unit is arranged to reassume said normal mode in response to a termination of said temporary malfunction and subsequent to reception of a fresh signal subsequent to termination of said temporary mafunction.

19. The power train of claim 18, wherein said fresh signal is transmitted by a sensor other than said at least one sensor which is prone to said temporary malfunction.

20. The power train of claim 19, wherein said other sensor is at least one of (a) a sensor which monitors the position of said at least one brake, (b) a sensor which generates a signal in response to detected presence of an operator in the motor vehicle, (c) said at least one sensor which is arranged to monitor the positions of said gear selecting and shifting means, (d) a sensor which monitors the positions of at least one openable and closable door forming part of the motor vehicle, (e) at least one sensor arranged to monitor the speed of the motor vehicle, and (f) a sensor constituting or forming part of an electronic control circuit for said engine.

21. The power train of claim 2, wherein the vehicle comprises an openable and closable hood, an openable and closable trunk and an openable and closable door and first, second and third additional sensors arranged to transmit to said control unit signals denoting the positions of said hood, said trunk and said door, at least one of said sensors and said signal transmitting means being prone to temporary malfunction and said control unit being arranged to reassume said normal mode in response to a termination of said temporary malfunction and in response to transmission by said additional sensors of signals denoting that said hood, said trunk and said door are closed.

22. The power train of claim 1, wherein said controlling means comprises means for converting analog signals from at least one of said sensors into non-analog signals.

23. The power train of claim 22, wherein said non-analog signals are digital signals.

24. The power train of claim 22, wherein said non-analog signals are binary signals.

25. The power train of claim 22, wherein said means for transmitting signals comprises at least one bus arranged to transmit said non-analog signals from said at least one sensor to said control unit.

26. The power train of claim 22, wherein said means for converting comprises an electronic circuit.

27. The power train of claim 26, wherein said at least one sensor comprises a housing and said electronic circuit is confined in said housing.

28. The power train of claim 26, further comprising a first housing for said at least one sensor and a second housing for said electronic circuit.

29. A method of operating a power train for use in a motor vehicle wherein a fuel consuming prime mover which is arranged to be started, operated and arrested serves to transmit torque to a transmission which is shiftable into and from a plurality of gears in which the transmission tends to move the vehicle in response to at least partial engagement of an automated torque transmitting clutch which is controlled by a system including a signal receiving, processing and transmitting control unit, an actuator operable to select the magnitude of torque being transmitted by the clutch in response to processed signals from the control unit, and a plurality of sensors which are arranged to transmit signals to the control unit and at least one of which is prone to malfunction, comprising the step of changing, in response to malfunctioning of the at least one sensor, the mode of operation of the control unit from a normal mode in which the transmission moves the vehicle in an at least partially engaged condition of the clutch, while the prime mover is in the process of transmitting torque to the clutch and while the transmission is in gear, to an emergency mode in which the transmission is prevented from moving the vehicle while the transmission is in gear, the prime mover is operated and a member which is actuatable to increase the consumption of fuel by the prime mover is not actuated.

30. The method of claim 29, further comprising the step of setting the vehicle in motion by way of the engaged clutch and the transmission upon termination of a temporary malfunction of the at least one sensor.

* * * * *